United States Patent [19]
Arakawa et al.

[11] Patent Number: 5,337,724
[45] Date of Patent: Aug. 16, 1994

[54] INTAKE SYSTEM FOR AN INTERNAL COMBUSTION ENGINE WITH A SUPERCHARGER

[75] Inventors: Yukio Arakawa, Higashihiroshima; Toshimichi Akagi; Kouichi Hatamura, both of Hiroshima; Makoto Kishida, Higashihiroshima, all of Japan

[73] Assignee: Mazda Motor Corporation, Hiroshima, Japan

[21] Appl. No.: 953,696

[22] Filed: Sep. 30, 1992

[30] Foreign Application Priority Data

Sep. 30, 1991 [JP] Japan .................. 3-252565
Sep. 30, 1991 [JP] Japan .................. 3-252579
Sep. 30, 1991 [JP] Japan .................. 3-252580

[51] Int. Cl.$^5$ .................................. F02B 33/00
[52] U.S. Cl. ...................................... 123/563; 60/599
[58] Field of Search ............... 60/599; 123/559.1, 563

[56] References Cited

U.S. PATENT DOCUMENTS 4,878,460 11/1989 Uchida et al. ............ 123/563 X
5,058,558 10/1991 Ueda et al. ............... 123/559.1

FOREIGN PATENT DOCUMENTS 59-218356 12/1984 Japan .
1-315612 12/1989 Japan .
2-227517 9/1990 Japan .
2-264117 10/1990 Japan .

*Primary Examiner*—Richard A. Bertsch
*Assistant Examiner*—Charles G. Freay
*Attorney, Agent, or Firm*—Keck, Mahin & Cate

[57] ABSTRACT

An intake system includes a supercharger for use with a power train. The power train includes a transverse engine and a transmission disposed transversely behind the engine. The engine has first and second rows of cylinders. Cylinders in each row are intended not to be fired one after another. The first and second rows of cylinders are offset sideways relative to each other. The intake system has an individual downstream intake part, downstream from the supercharger supported by the power train, for each row of cylinders. The individual downstream intake port includes a branch intake passage, branching off downstream from the supercharger and supported by the power train, and an inter-cooler disposed in the branch intake passage. One of the inter-coolers is located on a front side of the engine, and another of the inter-coolers is located above the transmission.

19 Claims, 11 Drawing Sheets

INTAKE SYSTEM FOR AN INTERNAL COMBUSTION ENGINE WITH A SUPERCHARGER

BACKGROUND OF THE INVENTION

1. Field of the Invention

The present invention relates to an intake system for an internal combustion engine equipped with a supercharger.

2. Description of Related Art

Intake systems for use with internal combustion engines equipped with mechanical superchargers typically include intake pipes, individually provided for cylinders, for introducing air into the cylinders, throttle bodies with built-in throttle valves, and inter-coolers for cooling air downstream from the mechanical superchargers.

In such an intake system, the throttle body is conventionally disposed between an upstream intake pipe, including an air cleaner, and the mechanical supercharger, and is typically mounted on or supported by an engine as well as the mechanical supercharger. Internal combustion engines operate at fairly high temperatures, and temperature differences are caused locally. Consequently, if an internal combustion engine causes a relatively large local temperature difference between a portion of the intake system in which the throttle body is mounted and a portion in which the mechanical supercharger is mounted, the two portions are subjected to largely different thermal expansions. An undesirable external force, therefore, is applied to the throttle body and the mechanical supercharger. The mechanical supercharger, moreover, typically suffers from different modes of vibration. One such mode is transmitted from the engine through the valve body, and the other is a self-generating heavy vibration caused by operation of the mechanical supercharger at a high speed of rotation. Such an undesirable external force and the different modes of vibration decrease the durability and the operative life of the mechanical supercharger.

To eliminate the transmission of vibration of the engine to the mechanical supercharger through the throttle body, it was thought that the throttle body should be "cantilevered" by the mechanical supercharger. In such a structure, however, since the throttle body is made of metal and is fairly heavy, a decrease in durability of a connection between the throttle body and the mechanical supercharger and/or between the throttle body and part of the intake system upstream from the throttle body may occur.

In addition, noise is caused by the intake system, due to vibration of an air column generated in the intake pipe by the mechanical supercharger, as well as due to vibration of the throttle body. To eliminate a specific frequency of noise, it has been proposed to provide a resonator in this kind of intake system. Such an intake system is known from, for instance, Japanese Unexamined Patent Publication No. 59-218,356.

The intake system described in the publication mentioned above reduces vibration to some extent. However, it is still hard for such an intake system to eliminate or reduce vibration caused by and around the throttle valve.

Individual intake pipes typically merge into an air integration device, such as a surge tank. The air integration device is provided for stabilizing air flowing into the cylinders through the individual intake pipes. Intake air interference may possibly be caused in the integration device between adjoining individual intake pipes of cylinders which perform their intake strokes one after another. In order to eliminate intake air interference and, therefore, avoid a decrease in air charging efficiency, it is typical to provide one integration device for individual intake pipes of each of two groups of cylinders which do not fire one after another. This results in the provision of two intake systems. Such intake systems are known from, for instance, Japanese Unexamined Patent Publication No. 2-227,517.

The provision of two intake systems makes the whole intake system structure bulky. Additionally, if path lengths of the two intake systems are different, responsiveness is apparently different between the intake systems. This causes irregularity in air-fuel control.

When intake air is supercharged, it is adiabatically compressed, and its temperature rises. Supplying heated air into a combustion chamber is undesirable for a sufficient increase in air charging efficiency. For this reason, the intake system is typically equipped with an inter-cooler in an air passage downstream from the mechanical supercharger. Because the film coefficient of heat transfer of air is very small, the inter-cooler should have a fairly large heat transfer area for efficient air cooling. Such an inter-cooler has a high resistance to intake air and is bulky.

It has recently been attempted to provide various devices and functional elements in engine rooms in order to realize high performance vehicles. On the other hand, it has also been a recent tendency to provide as low an engine room hood as possible. This leads to both a small, tight engine room and a difficulty in arranging the inter-cooler in such a small engine room. If the inter-cooler is an air cooling type, it is even more difficult to arrange the inter-cooler so that it is well ventilated in the small engine room.

Certain vehicles have power trains in which engines and transmissions are connected in series in transverse directions of the vehicle bodies. In such a vehicle, it is advantageous, in order to increase the cooling performance of an inter-cooler, to arrange the inter-cooler in what is called a "dead space," formed above the transmission, in which many large devices and elements are not arranged and which is well ventilated. However, since the dead space is usually relatively small, it is difficult to install an inter-cooler, having a sufficiently large capacity and area of heat transmission, in the dead space. Otherwise, in vehicles in which a V-type engine is arranged in a lengthwise direction of the vehicle body, increasing the cooling performance of the inter-cooler is realized by arranging the inter-cooler in front of the V-type engine so as to place its broadest face so that it is directed forward. This arrangement is not applicable, however, to transverse power trains.

SUMMARY OF THE INVENTION

It is an object of the present invention to provide an intake system for an engine equipped with a mechanical supercharger which provides a connection structure between a mechanical supercharger and a throttle body with high structural rigidity and durability so as to eliminate vibration and noise caused by and around the throttle body.

It is another object of the present invention to provide an intake system for an engine equipped with a mechanical supercharger which is compact and arranged so that it is well ventilated in a relatively small or narrow engine room.

It is another object of the present invention to provide an intake system for an engine equipped with a mechanical supercharger which is compact but operates with high cooling efficiency.

The foregoing objects of the present invention are achieved by providing an intake system including a supercharger for use with a certain type of power train. The power train includes a transverse internal combustion engine and a transmission disposed transversely behind the engine. The internal combustion engine has first and second rows of cylinders. It is intended to have the cylinders in each row not be fired one after another. The first and second rows of cylinders are offset relative to each other in a transverse direction of the vehicle body. The intake system has an individual downstream intake part, downstream from the supercharger supported by the power train, for each row of cylinders. The individual downstream intake part includes a branch intake passage means, branching off downstream from the supercharger and supported by the power train, and an inter-cooler means disposed in the branch intake passage means. One of the inter-cooler means is located on a front side of the engine, and another of the inter-cooler means is located above the transmission. The branch intake passage means for the first and second rows of cylinders are almost identical to each other in length.

The intake system further includes an individual intake passage means, extending from cylinders of each cylinder row, and integration means, connected to the branch intake passage means, into which the individual intake passage means merge.

The intake system has a throttle body with a built-in throttle valve, included in a common intake part, which is supported between and by the upstream intake passage means and the supercharger means.

BRIEF DESCRIPTION OF THE DRAWINGS

The above and other objects and features of the present invention will be clearly understood from the following description of a preferred embodiment thereof when considered in conjunction with the appended drawings, in which.

DESCRIPTION OF THE PREFERRED EMBODIMENT

Figure 1:
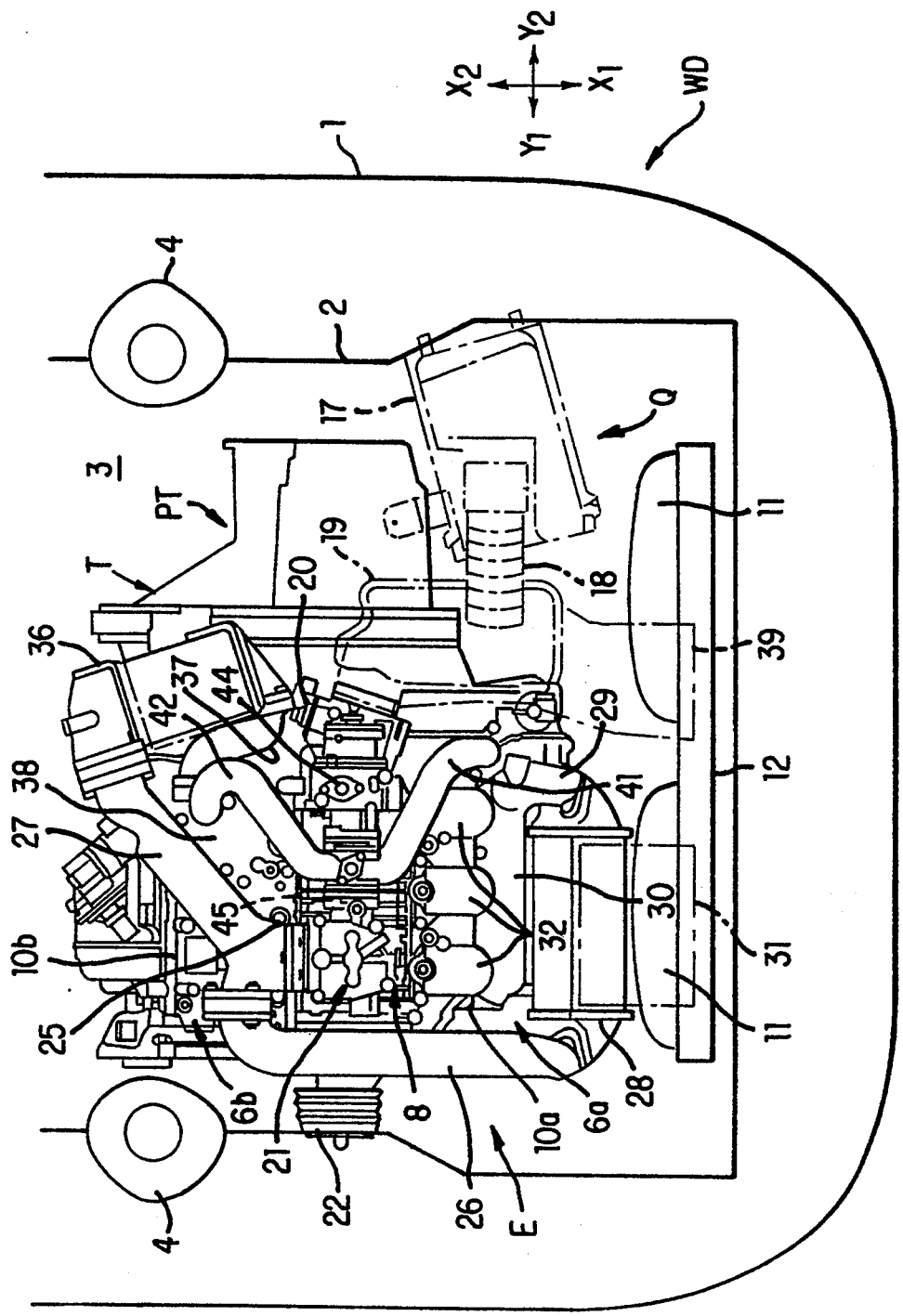
FIG. 1 is a schematic plan view of a power train including an engine equipped with an intake system in accordance with a preferred embodiment of the present invention.
Figure 5:
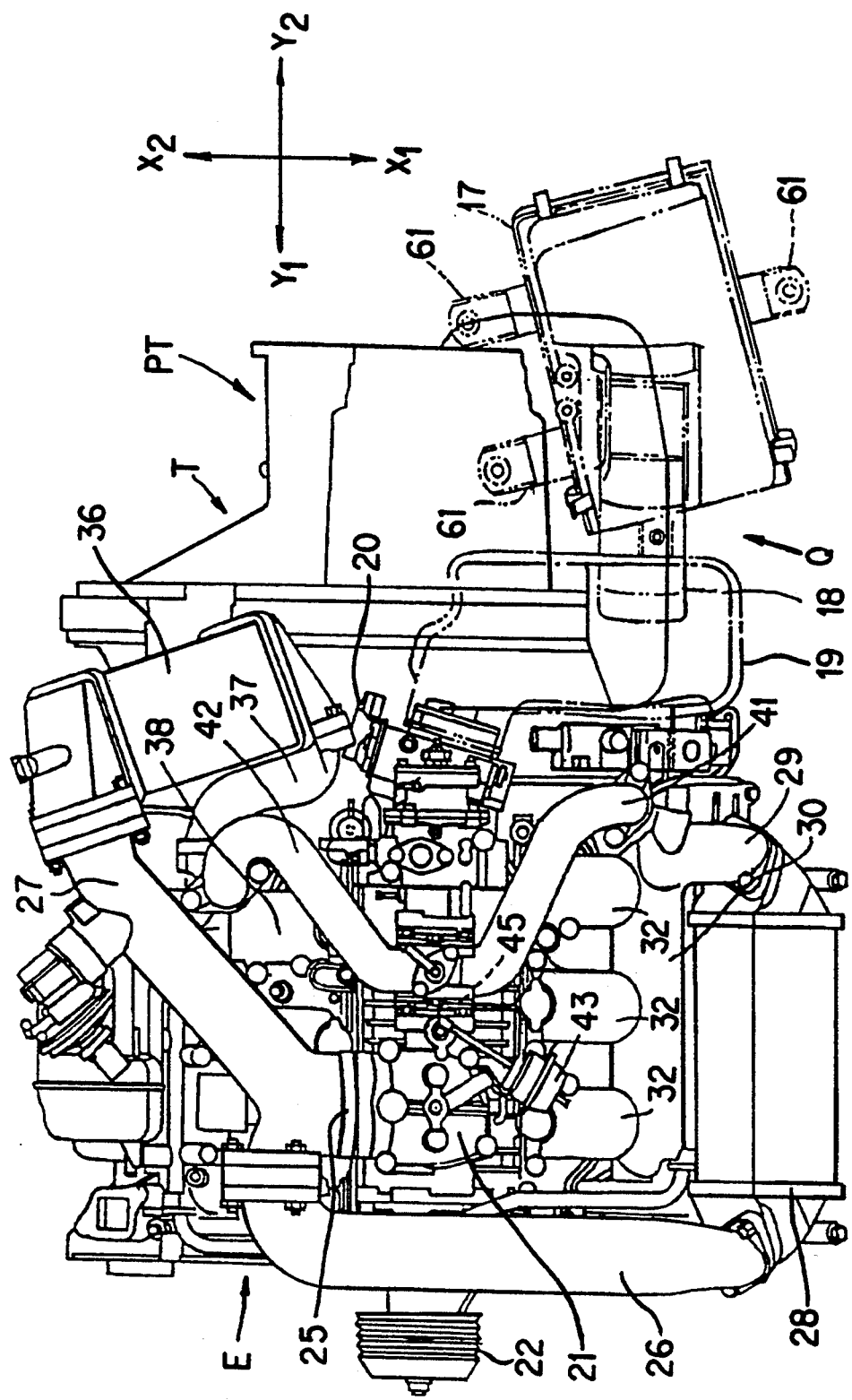
FIG. 5 is an enlarged plan view of the power train shown in FIG. 1.

Referring to the drawings in detail and, in particular, to FIGS. 1 and 5, an interior of an engine room is shown. In the engine room, an intake system for an engine equipped with a supercharger in accordance with a preferred embodiment of the present invention is provided. A front section 1 of a vehicle body WD is formed with an engine compartment or room 3 defined by an inner wall 2 of the vehicle body WD. In addition to a low height of the engine room 3 for a low positioned engine room hood 5, the engine room 3 is provided with suspension towers 4 at opposite sides thereof. The engine room 3 has a relatively small interior. In the engine room 3, an engine E, such as a V-6 internal combustion engine, a transmission T and an intake system Q are arranged in appropriate relative positions. The engine E is mounted in a transverse direction (which is hereafter referred to as a $Y_1$–$Y_2$ direction) in the engine room 3 so as to orient its output shaft, such as a crankshaft, in a transverse direction of the vehicle body WD. The transmission T is disposed adjacent to the engine E so as to place its input shaft (not shown) in parallel with the engine output shaft. In other words, a power train PT, which includes the engine E and the transmission T connected in series, is mounted transversely in the engine room 3.

The engine E, formed by a cylinder head 6 and a cylinder block 7, consists of a first cylinder bank 6a and a second cylinder bank 6b arranged in a V-formation. Between the cylinder banks 6a and 6b, a predetermined angle, for example, a relative angle of approximately 60 degrees, is provided. The engine E has six cylinders which are divided into two groups. The cylinders in each group are disposed in one and the same cylinder bank 6a or 6b, respectively, so that adjoining cylinders in each cylinder bank 6a or 6b do not fire one after another. The cylinders in the first cylinder bank 6a and the cylinders in the second cylinder bank 6b are arranged in rows parallel to the crankshaft, respectively. The row of the cylinders in the first cylinder bank 6a is offset in the $Y_1$–$Y_2$ direction with respect to the vehicle body WD in which it is mounted relative to the row of the cylinders in the second cylinder bank 6b. Offsetting the rows of the cylinders makes the width of the engine E small and provides small spaces, which are called "dead spaces," on opposite transverse ends of the first and second cylinder banks 6a and 6b, respectively.

Cylinder head covers 10a and 10b are provided to cover the upper portions of left and right cylinder head portions of the cylinder head 6, respectively. Below the engine E, an oil pan 9 is attached to the cylinder block 7. In the engine room 3, a radiator 12 having two fans 11 is provided. The fans are disposed on a front side of the engine E in a lengthwise direction (which is hereafter referred to as an $X_1$–$X_2$ direction). Further, an exhaust manifold 51, an oxygen sensor 52, a catalyst 53, a water temperature sensor 54, a thermostat casing 55, a water pipe 56, etc., are appropriately arranged on the front side of the engine E, on which the radiator 12 is disposed. On another or rear side of the engine E in the $X_1$–$X_2$ direction, opposite to the front side on which the radiator 12 is disposed, a starter 58 is provided.

As was previously described, because the transmission T is connected with the engine E in series in the transverse direction, the power train RT, which includes the engine E and the transmission T, is long in the transverse direction $Y_1$-$Y_2$. However, because the height of the transmission T is considerably lower than the height of the engine E, a relatively large dead space is provided above the transmission T. Further, because the power train PT is mounted transversely in the engine room 3, no large device is disposed above the transmission T on the front side of the power train PT. Consequently, fresh air comes into a space above the transmission T while the vehicle travels.

The intake system Q is provided with certain elements common to all of the cylinders of the cylinder banks 6a and 6b. Such elements include an air entrance opening 15, an air duct 16, an air cleaner 17, a connection pipe 18 including a bellows, a resonator 19, a throttle body 20 with a built-in throttle valve (not shown) and a lever 75 (see FIG. 8), and a mechanical supercharger 21, such as a Lysholm type supercharger. These elements are provided, in the order recited, from upstream to downstream locations with respect to intake air flow. Each of the air cleaner 17, the resonator 19, the throttle body 20 and the mechanical supercharger 21 may be of any well known type. The mechanical supercharger 21 has a rotor (not shown) which is operationally coupled to a pulley 22 driven by the engine E. The common elements 15 to 19 of the intake system Q, except for the throttle body 20 and the mechanical supercharger 21, are made of plastic and are basically arranged on one side, for example, the left side, of the engine E in the transverse direction $Y_1$-$Y_2$.

Downstream from and close to a discharge port 25 of the mechanical supercharger 21, the intake system Q is provided with first and second branch intake passages for the first cylinder bank 6a and the second cylinder bank 6b, respectively. The first branch intake passage, which includes a first upstream intake pipe 26 and a first downstream intake pipe 29, is provided with an air cooling type of first inter-cooler 28, disposed between the first upstream intake pipe 26 and the first downstream intake pipe 29, and a first surge tank 30 (see FIG. 5). The first inter-cooler 28 is attached to a first air duct 31, through which fresh cooling air is introduced. The first surge tank 30 is connected with individual intake pipes 32, through which intake air is introduced into the cylinders of the first cylinder bank 6a.

Similarly, the second branch intake passage, which includes a second upstream intake pipe 27 and a second downstream intake pipe 37, is provided with an air cooling type of second inter-cooler 36, disposed between the second upstream intake pipe 27 and the second downstream intake pipe 37, and a second surge tank 38. The second inter-cooler 36 is attached to a second air duct 39 through which fresh cooling air is introduced. The second surge tank 38 is connected with individual intake pipes 32, through which intake air is introduced into the cylinders of the second cylinder bank 6b. The first and second branch intake passages between upstream ends of their upstream intake pipes 26 and 27 and downstream ends of their upstream intake pipes 27 and 37 are formed so as to have almost equal path lengths. This allows intake air flows in the first and second branch intake passages to respond identically to acceleration, so as to provide an accurate air-fuel ratio control. Since adjoining cylinders in each cylinder bank 6a or 6b do not fire one after another, no interference of intake air is generated in each of the first and second surge tanks 30 and 38, so as to provide increased air charging efficiency.

First and second bypass intake pipes 41 and 42 connect the mechanical supercharger 21 with the first and second surge tanks 30 and 38, respectively, bypassing the first and second inter-coolers 28 and 36, so that if it is not required to cool the intake air, the intake air is directly introduced into the cylinders through the first and second bypass intake pipes 41 and 42. In order to introduce intake air directly into the cylinders, a valve 45, switched by means of an actuator 43, is provided between the mechanical supercharger 21 and the first and second bypass intake pipes 41 and 42. The mechanical supercharger 21 is provided with a pressure regulation valve 44 for regulating supercharging pressure.

Figure 6:
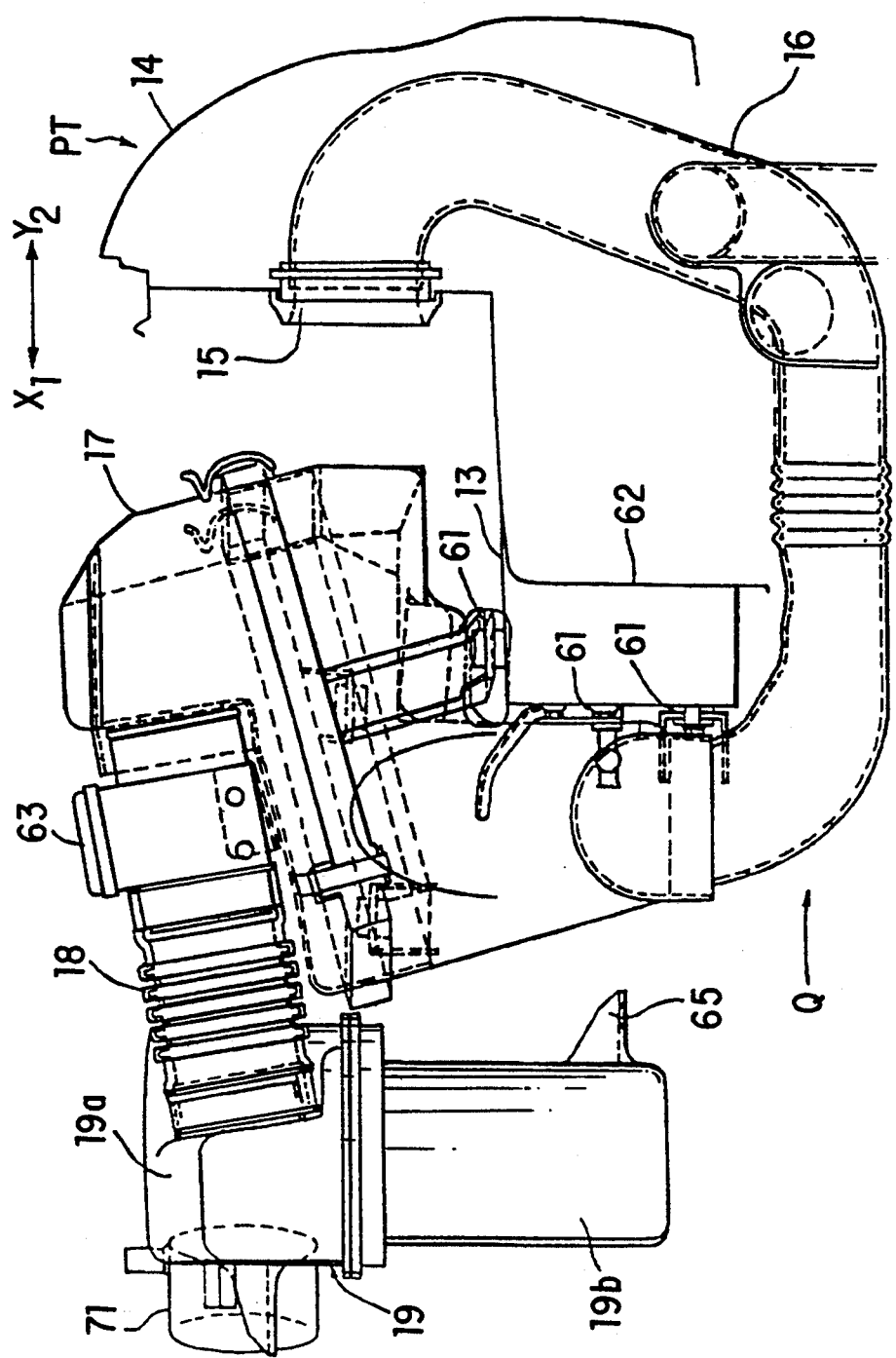
FIG. 6 is a side view of an air cleaner and some elements around the air cleaner of the intake system.
Figure 7:
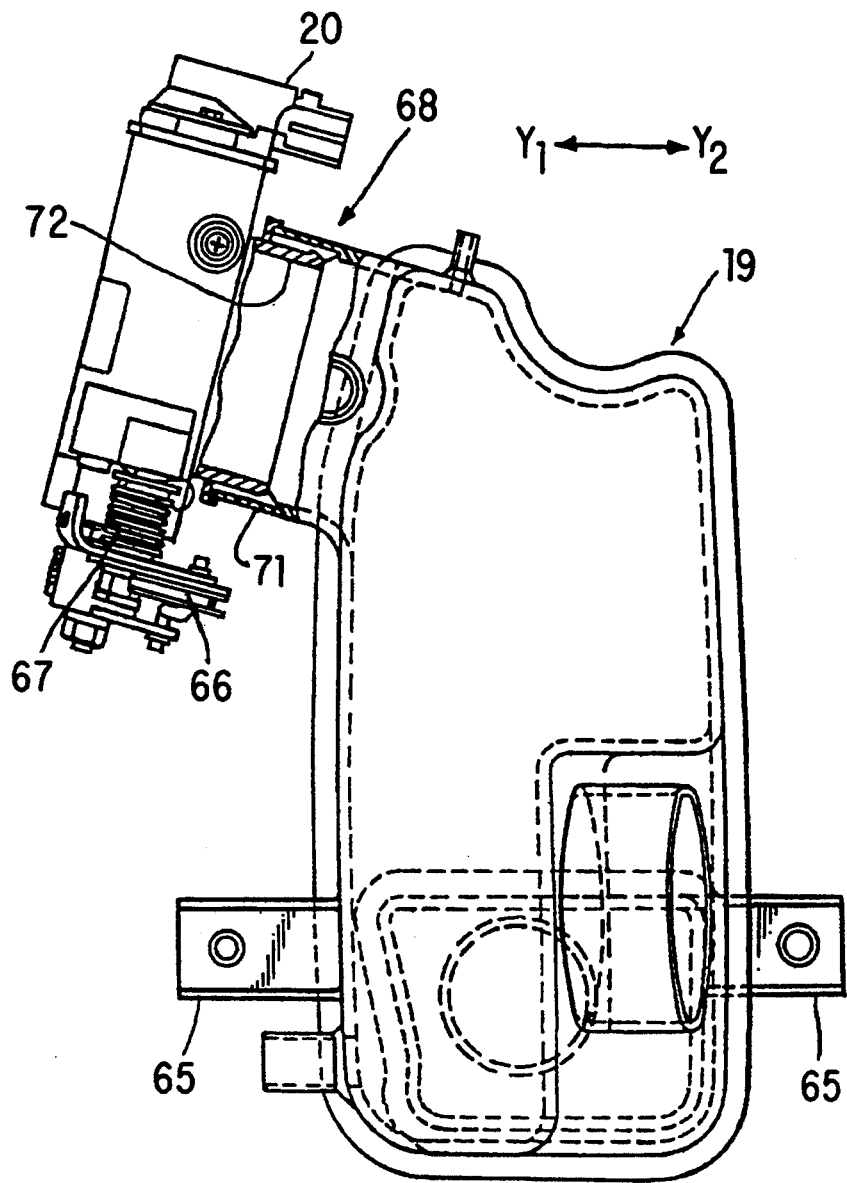
FIG. 7 is a side view of a resonator and some elements around the resonator of the intake system.
Figure 8:
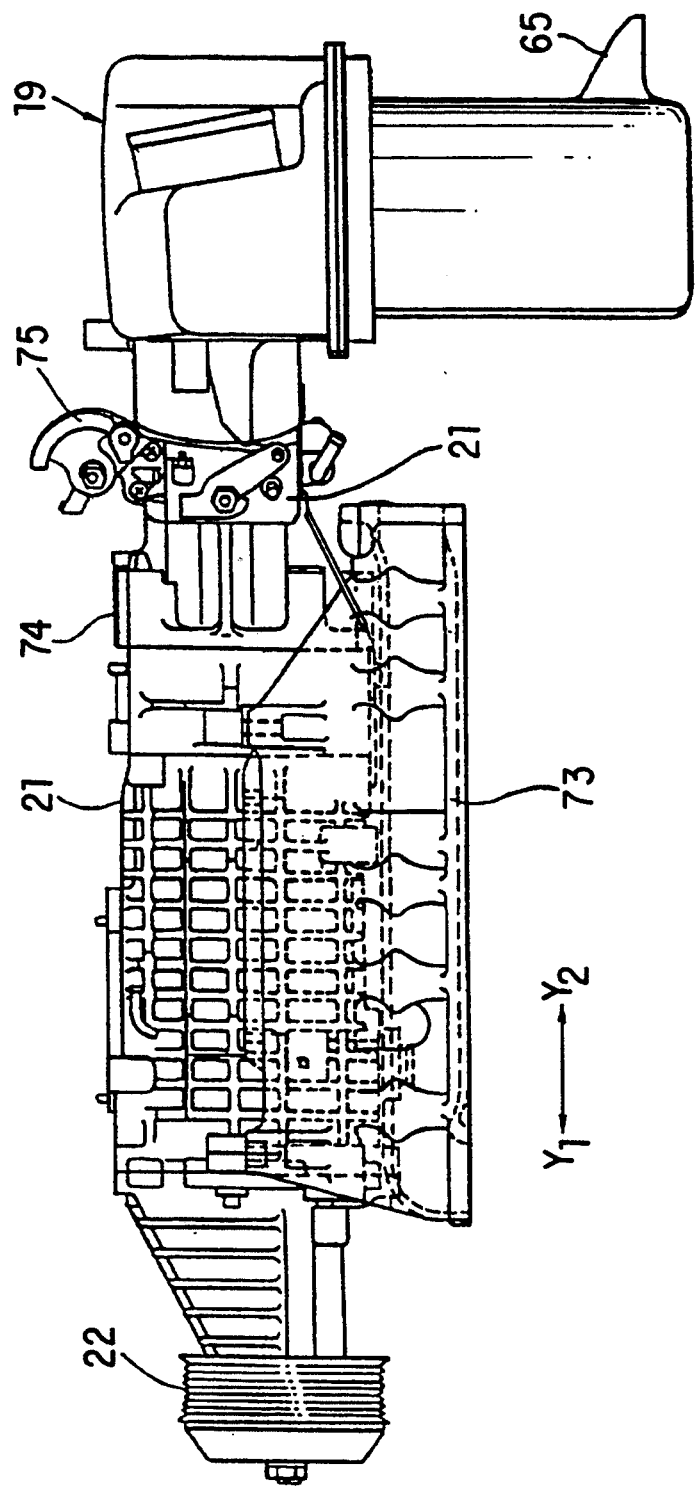
FIG. 8 is a side view of a mechanical supercharger and some elements around the mechanical supercharger of the intake system.
Figure 9:
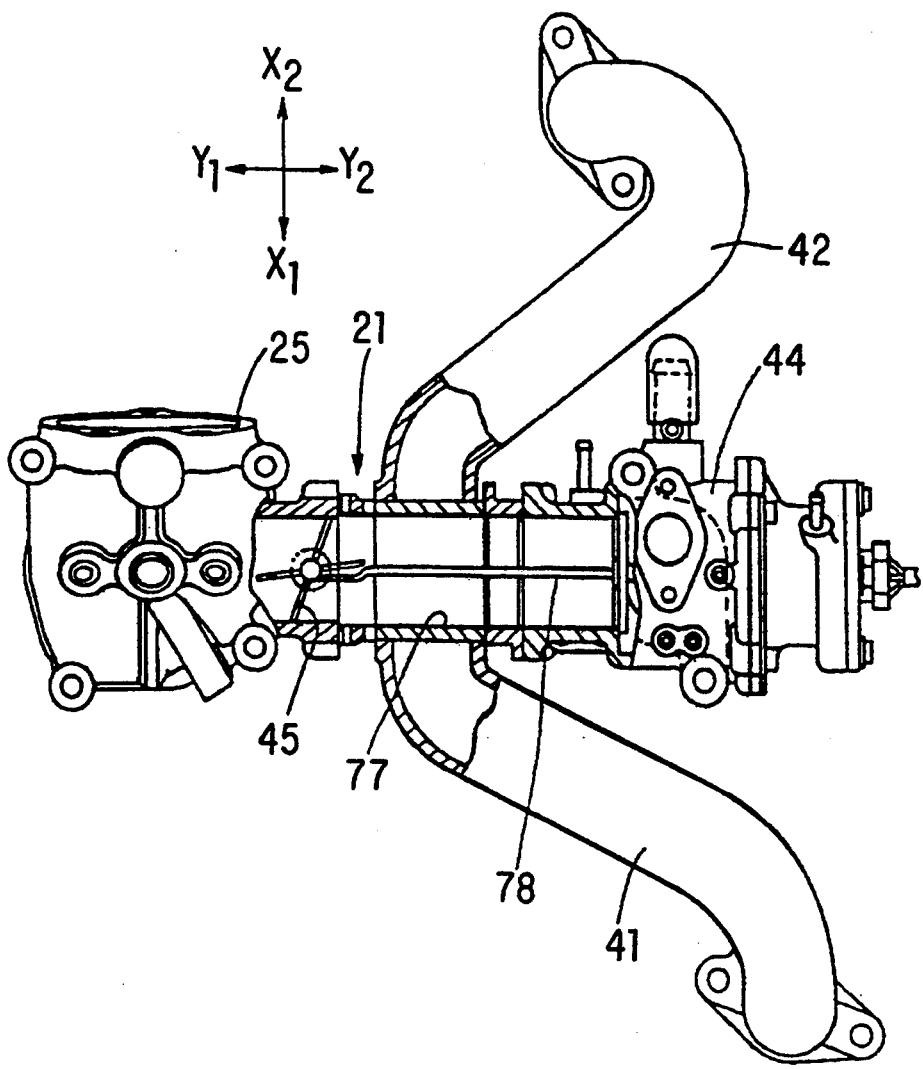
FIG. 9 is a plan view showing, partly in section, the mechanical supercharger.

FIGS. 6 to 11 show structural and arrangement details of the elements of the intake system Q. The mechanical supercharger 21, which is driven by the engine E, has a configuration which is elongated in a lengthwise direction of a shaft of the rotor thereof. The mechanical supercharger 21 is placed in the V-shaped space 8 between the first and second cylinder banks 6a and 6b so as to extend in the transverse direction $Y_1$-$Y_2$ of the vehicle body WD. This arrangement of the mechanical supercharger 21 allows the intake system Q to be made compact. As shown in FIG. 8, the mechanical supercharger 21, thus arranged, has its intake port 74 formed in a rotor casing placed coaxially with the rotor shaft so as to open to one side, for instance, the left side ($Y_2$), of the vehicle body WD. The rotor casing is attached to the throttle body 20. The intake port 74 of the mechanical supercharger 21, thus formed and placed, enables intake air to pass smoothly into the mechanical supercharger 21 through the throttle body 20, so as to reduce resistance to intake air flow. The discharge port 25 of the mechanical supercharger 21 is formed near one side, for instance, the right side, of the rotor casing so as to open to the rear side $X_2$ of the rotor casing facing the second cylinder bank 6b. In other words, the discharge port 25 is formed in a location at which the pressure of intake air rises to a maximum and is directed in a direction in which intake air is discharged by the rotor. The mechanical supercharger 21 is secured to the engine E by a bracket 73 shown in FIG. 8 which has a stiffness sufficient to prevent vibration due to high rotational speed. The mechanical supercharger 21 is provided with a partition wall 78 at a juncture portion 77 from which the first and second bypass intake pipes 41 and 42 branch off so as to separate. The provision of the partition wall 78 prevents intake air, introduced into the first and second bypass intake pipes 41 and 42, from causing interference at the juncture portion 77.

The first upstream intake pipe 26 branches off from the discharge port 25 of the mechanical supercharger 21 and extends initially toward the right side ($Y_1$). It turns approximately at a right angle at the right side end of the second cylinder bank 6b and then extends toward the front side ($X_1$). The first upstream intake pipe 26 is connected, at its front end, with the first inter-cooler 28 located on the front side ($X_1$) of the first cylinder bank 6a. The first upstream intake pipe 26 is arranged so as to effectively use the "dead space" provided on the right side ($Y_1$) of the first cylinder bank 6a due to the offset of the row of the cylinders in the first cylinder bank 6a relative to the row of the cylinders in the second cylinder bank 6b. This allows the intake system Q to be made compact. The second upstream intake pipe 27 branches off from the discharge port 25 of the mechanical supercharger 21 and extends to the rear left side, slightly beyond the left side (Y$_2$) of the second cylinder bank 6b. The second upstream intake pipe 27 is connected, at its rear end with the second inter-cooler 36. The second upstream intake pipe 27 is also arranged so as to effectively use the "dead space" provided on the left side (Y$_2$) of the second cylinder bank 6a due to the offset of the row of the cylinders in the first cylinder bank 6a relative to the row of the cylinders in the second cylinder bank 6b. Since the location to which the second upstream intake pipe 27 extends is above transmission T and is spatially affordable, a high degree of freedom in laying out the second downstream intake pipe 37 is provided. This allows the second downstream intake pipe 37 to "snake" so that its length can be increased to some extent so that the second branch intake passage, including the second upstream and downstream intake pipes 27 and 37, is as long as the first branch intake passage, including the first upstream and downstream intake pipes 26 and 29.

The first inter-cooler 28 is disposed in front of the engine E to place its broad face so that it is directed forward. In addition to providing easy conductivity of fresh air into the inter-cooler 28 through the first air duct 31, the space in which the first inter-cooler 28 is located is well ventilated by fresh air while the vehicle is traveling. Consequently, the cooling performance of the first inter-cooler 28 is enhanced. The second inter-cooler 36 is disposed in the left "dead space" above the transmission and beyond the left side (Y$_2$) of the second cylinder bank 6a so as to incline in the lengthwise direction and cause the level of the rear end to be higher than that of the front end. According to this arrangement, the second inter-cooler 36 produces easy conductivity of fresh air and is able to be made compact as well as providing a high degree of freedom in laying out the second inter-cooler 36. In addition to having the space in which the first inter-cooler 28 is located be well ventilated by fresh air while the vehicle is traveling, the first inter-cooler 28 is fed with fresh air through the second air duct 39, and cooling performance is enhanced.

The air cleaner 17 is made of plastic and has an acoustical material built therein. The air cleaner is secured to a body frame 62 by a plurality of fittings 61 as shown in FIG. 6. A plastic fresh-air duct 16 is connected to the under side of the air cleaner 17. An inlet 15 of the fresh-air duct 16 is secured to an apron 13 connected to a fender 14. A plastic connection pipe 18, including an intermediate rubber bellows, is connected at its upstream end to the top of the air cleaner 17 and at its downstream end to the resonator 19. The connection pipe 18 is provided with an air-flow meter 63 at the upstream portion.

Figure 2:
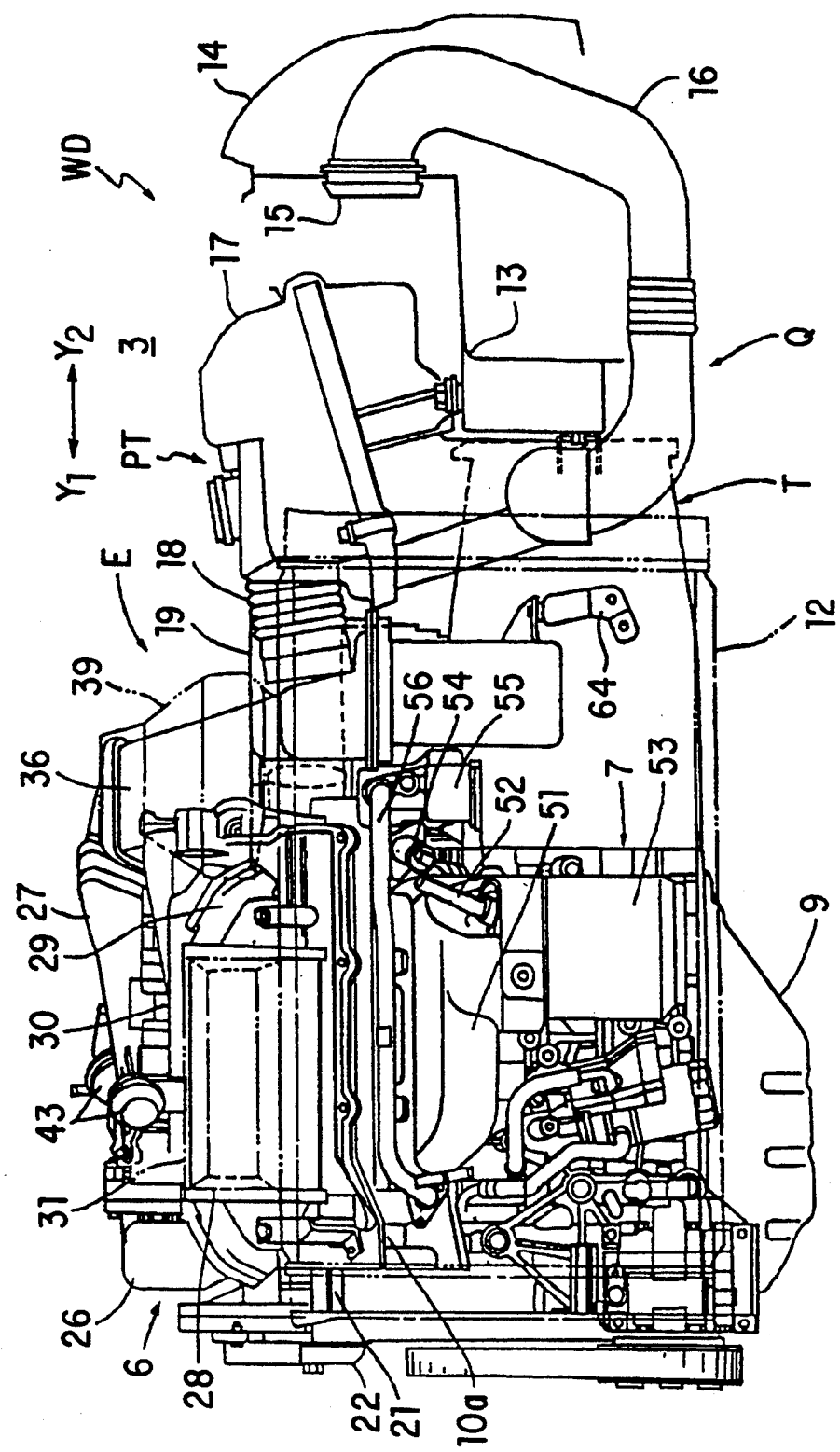
FIG. 2 is a side view of the power train shown in FIG. 1.
Figure 3:
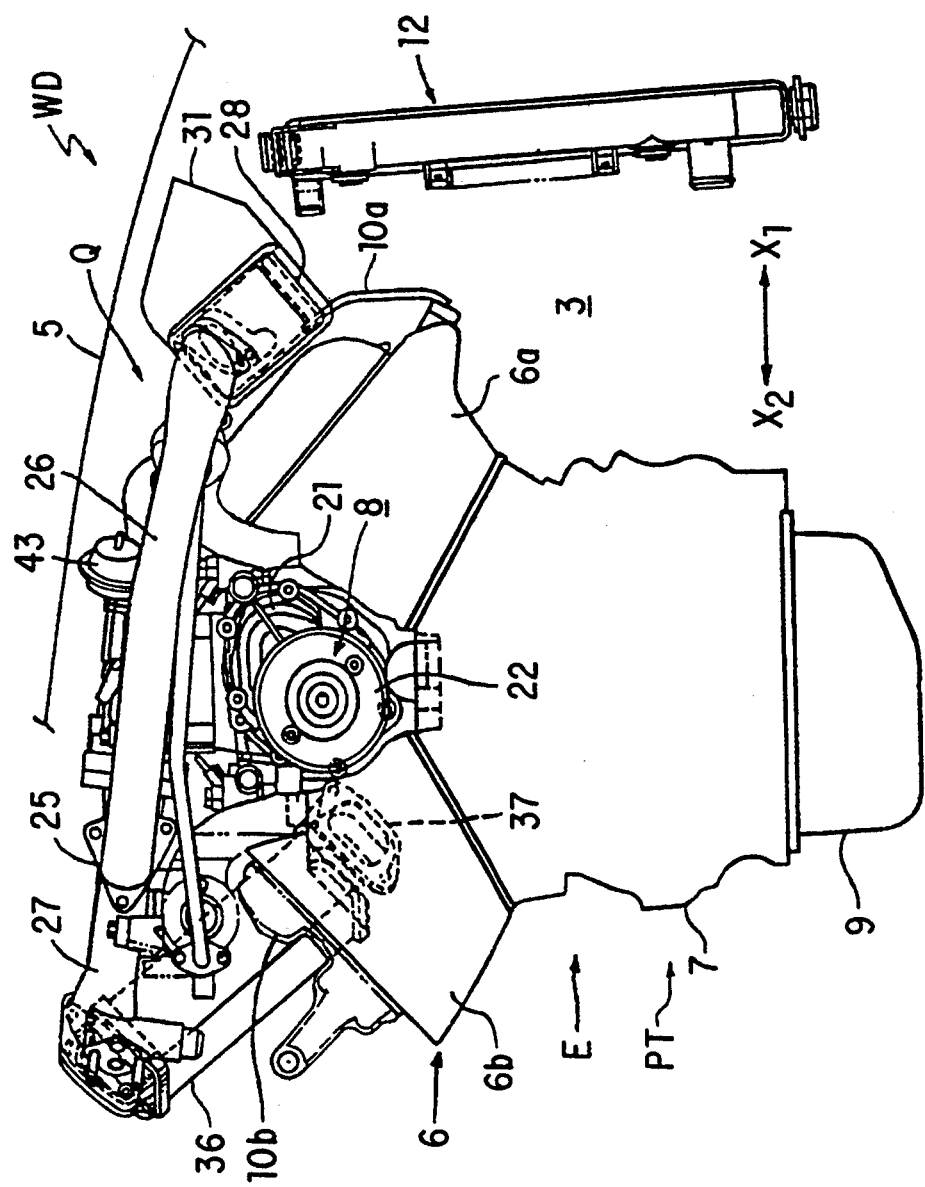
FIG. 3 is a front view of the power train shown in FIG. 1.
Figure 4:
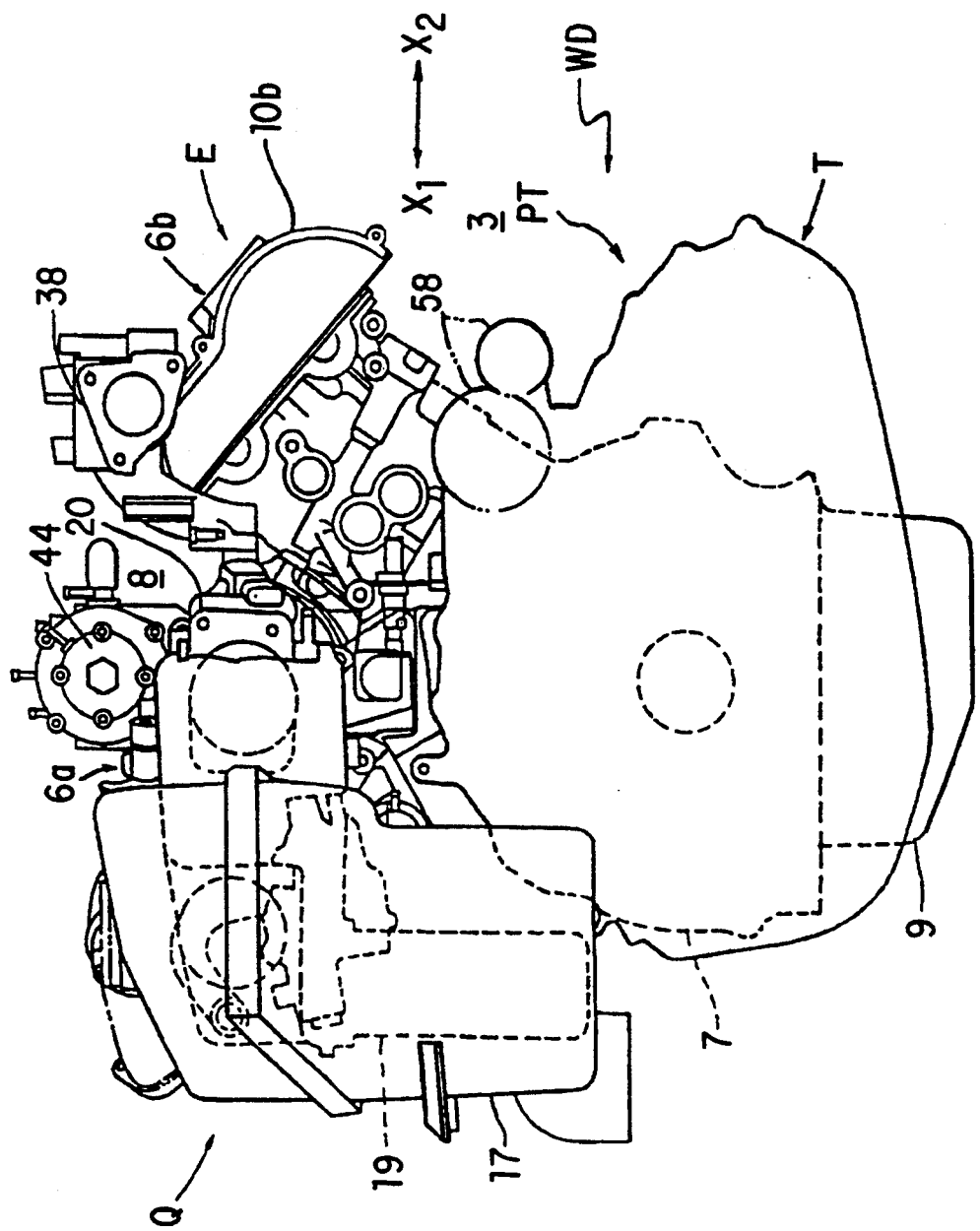
FIG. 4 is a rear view of the power train shown in FIG. 1.

As is well known in the art, the resonator 19 causes a column of intake air having a predetermined frequency in the intake system Q to resonate so as to decrease noise. The resonator 19 is formed with a plurality of brackets 65 through which it is connected to the transmission T by connecters 64 (see FIG. 2). The resonator 19 has an expansion chamber 19a and a resonance chamber 19b, which communicate with each other. In each of the chambers 19a and 19b, an acoustical material is built in. As shown in FIG. 7, the resonator 19 is provided with a cylindrical fitting sleeve 71, which is firmly connected with a cylindrical fitting sleeve 72 integrally formed with the throttle body 20, so as to connect the resonator 19 and the throttle body 20.

The throttle body 20 has an aluminum housing and is provided with a throttle valve (not shown) mounted for rotation on a valve shaft 67. The throttle valve is operated by an accelerator pedal (not shown) through a link 66. The throttle body 20 is connected to the intake port 74 of the mechanical supercharger 21 disposed downstream therefrom as shown in FIG. 8. The throttle body 20 is not supported by the power train PT but by and between only the resonator 19 and the mechanical supercharger 21.

Figure 10:
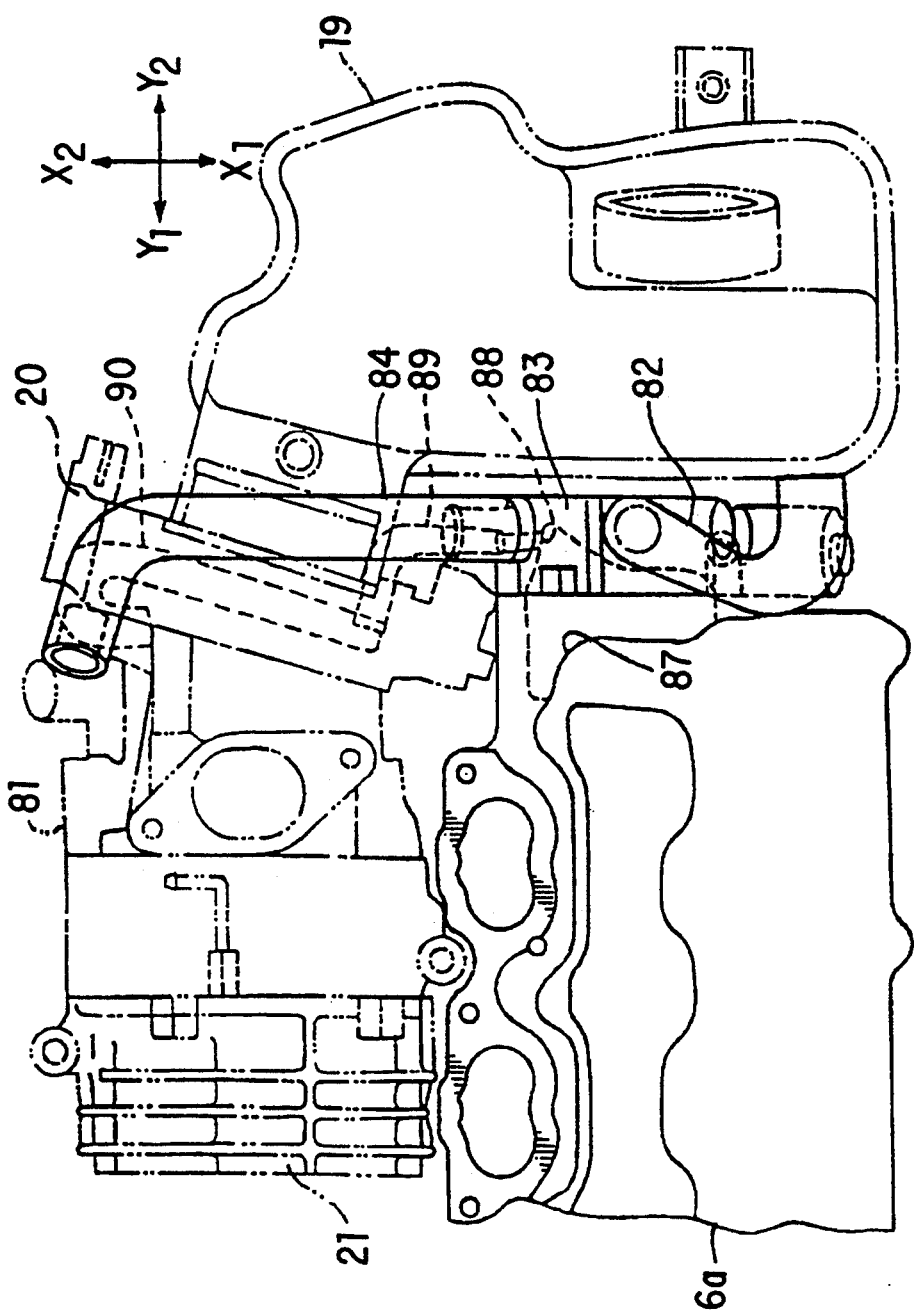
FIG. 10 is a plan view of an idle speed control mechanism cooperating with the intake system.
Figure 11:
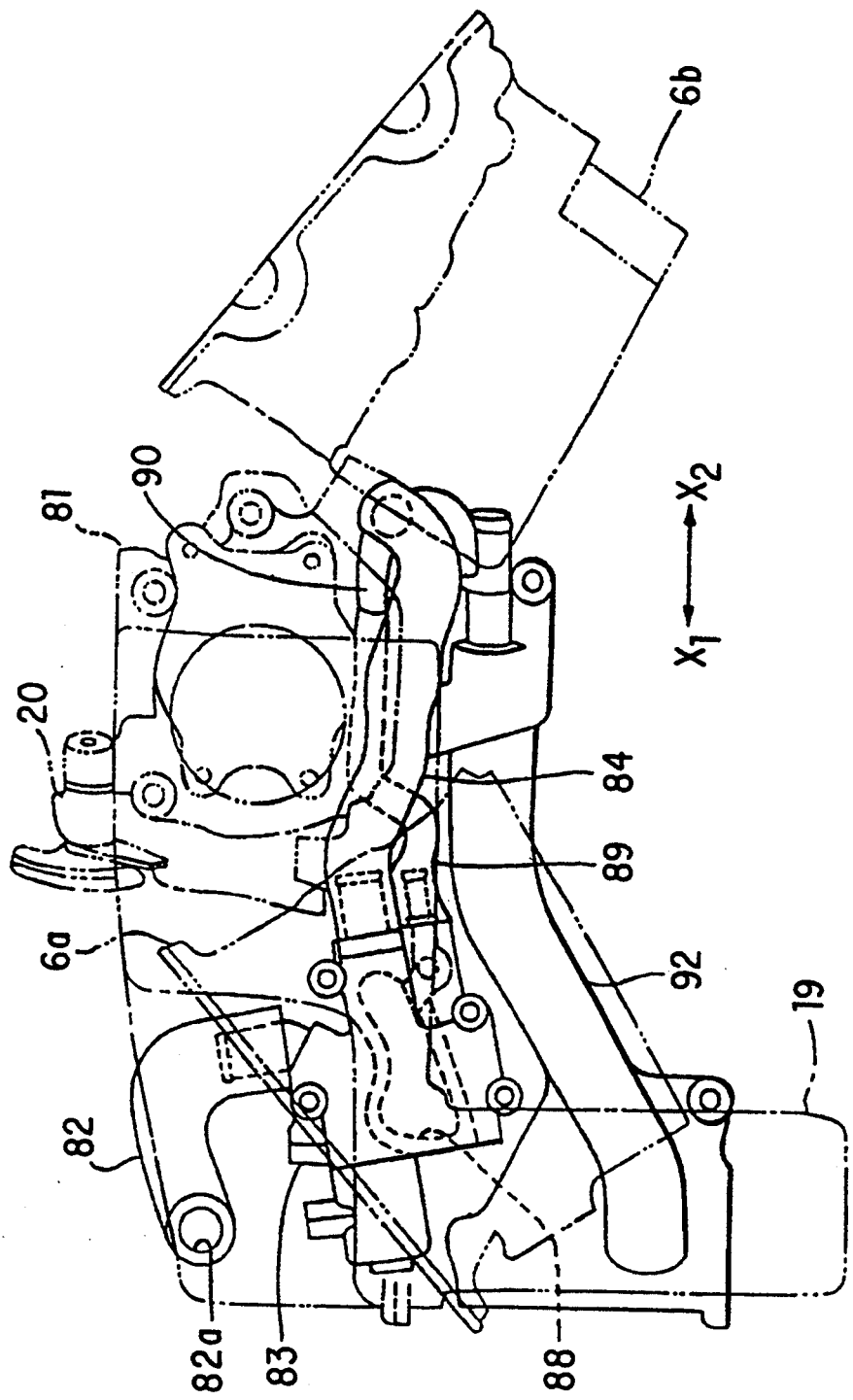
FIG. 11 is a rear view of the idle speed control mechanism.

The throttle body 20 has an idle speed control (ISC) mechanism. Such an idle speed control (ISC) mechanism is conventionally built in the throttle body 20. However, in order to make the throttle body 20, which is suspended at opposite ends by and between the resonator 19 and the mechanical supercharger 21, compact and lightweight, all elements of the ISC mechanism are provided outside of the throttle body 20. As shown in FIGS. 10, 11 and 12, the ISC mechanism includes an upstream hose 82, a downstream hose 84 and an idle speed control (ISC) valve 83 disposed between the upstream hose 82 and the downstream hose 84. The upstream hose 82 is connected to the resonator 19 through a connecter 82a. Air is supplied by the resonator 19 into an air pipe 81 through the upstream hose 82 and the downstream hose 83 when the throttle valve is fully closed. In an idle control, the amount of air supplied to the engine E, which is regulated by the ISC valve 83 so as to control the speed of the engine during idling, should be varied according to engine temperature. For this reason, engine cooling water is introduced into the ISC valve 83. That is, engine cooling water is introduced into a water jacket 88 provided in association with the ISC valve 8 from a water jacket 97 formed in the cylinder head 87. Thereafter, the engine cooling water is forced to flow into the throttle body 20 through an upstream heater hose 89 and then into a thermostat casing 92 through a downstream heater hose 90. Introducing the engine cooling water into the throttle body 20 prevents the throttle valve from being frozen.

It is to be understood that although a preferred embodiment of the present invention has been described, various other embodiments and variants may occur to those skilled in the art. Any such other embodiments and variants which fall within the scope and spirit of the present invention are intended to be covered by the following claims.

What is claimed is:

1. An intake system for use with a power train provided in a front section of a vehicle body of a vehicle and including an internal combustion engine and a transmission aligned with the engine in a transverse direction relative to the vehicle body, the engine and the transmission being arranged so as to place axes of their respective output shafts directed in the transverse direction of the vehicle body, said engine having a plurality of cylinder groups, cylinders in each of said cylinder groups being arranged in a row and not being fired one after another, said intake system comprising:

mechanical supercharger means, supported by said power train, for feeding air to the cylinders;

branch intake passage means, branching off downstream from said mechanical supercharger means, for feeding the air to each group of cylinders; and inter-cooler means, disposed in each said branch intake passage means, for cooling air fed to the cylinders, one of said inter-cooler means being located in front of the engine in a longitudinal direction relative to the vehicle body and another of said inter-cooler means being located above the transmission.

2. An intake system as defined in claim 1, and further comprising individual intake passages, extending from cylinders of each cylinder group, and integration means for receiving the air fed to the cylinders, connected to each said branch intake passage means, into which said individual intake passages merge.

3. An intake system as defined in claim 2, wherein all of said branch intake passage means have approximately the same length.

4. An intake system as defined in claim 2, wherein said mechanical supercharger means is located between the cylinder groups.

5. An intake system as defined in claim 4, wherein said mechanical supercharger means has a discharge port directed approximately perpendicularly relative to said cylinder rows.

6. An intake system as defined in claim 5, wherein all of said branch intake passage means have approximately the same length.

7. An intake system as defined in claim 5, wherein each said branch intake passage means branches off from said discharge port.

8. An intake system as defined in claim 7, wherein said inter-cooler means located above the transmission is inclined in a lengthwise direction of said vehicle so that its rear end level is higher than its front end level.

9. An intake system as defined in claim 8, wherein said engine has two cylinder banks arranged in a V-formation, cylinders in each cylinder group being disposed in the same cylinder bank and offset in said transverse direction relative to another cylinder row.

10. An intake system as defined in claim 1, wherein said inter-cooler means is of an air cooling type.

11. An intake system as defined in claim 1, and further comprising integration means, connected to each of said branch intake passage means, for coupling together said cylinders in each cylinder group.

12. An intake system for use with a power train provided in a front section of a vehicle body of a vehicle and including a V-type internal combustion engine and a transmission aligned with the engine in a transverse direction relative to the vehicle body, the engine and the transmission being arranged so as to place axes of their respective output shafts directed in the transverse direction of the vehicle body, said engine having elongated first and second cylinder banks set at an angle relative to each other to define a V-shaped space therebetween, each cylinder bank including a row of cylinders not intended to be fired one after another, the row of cylinders in one of said elongated first and second cylinder banks being offset in said transverse direction relative to the row of cylinders of another of said elongated first and second cylinder banks, said intake system comprising:

mechanical supercharger means, supported by said power train, for feeding air to the cylinders;

first and second branch intake passage means, branching off downstream from said mechanical supercharger means and coupling said mechanical supercharger means with said rows of cylinders of said elongated first and second cylinder banks, respectively, for feeding supercharged air from said mechanical supercharger means to said cylinders therethrough;

first and second inter-cooler means, disposed in said first branch intake passage means, for cooling supercharged air from said mechanical supercharger means, said first inter-cooler means being located in front of said engine in a longitudinal direction relative to the vehicle body, and said second inter-cooler means being located beside said one of said first and second cylinder banks, which is behind the other of said first and second cylinder banks in said longitudinal direction, and above the transmission.

13. An intake system as defined in claim 12, wherein said mechanical supercharger means is disposed in said V-shaped space so as to have its discharge port directed in a direction approximately perpendicular to said cylinder rows.

14. An intake system as defined in claim 13, wherein said first and second branch intake passage means have approximately the same length.

15. An intake system as defined in claim 13, wherein said mechanical supercharger means has an intake port directed away from the front section of the vehicle body.

16. An intake system as defined in claim 13, wherein each inter-cooler means is of an air cooling type.

17. An intake system as defined in claim 13, wherein said first and second branch intake passage means have approximately the same length.

18. An intake system as defined in claim 17, wherein said first branch intake passage means and said second branch intake passage means extend in opposite directions.

19. An intake system as defined in claim 18, and further comprising integration means, connected to each of said first and second branch intake passage means, for coupling together said cylinders in each cylinder bank.

* * * * *